United States Patent [19]
Douglas

[11] Patent Number: 5,082,108
[45] Date of Patent: Jan. 21, 1992

[54] MODULAR CONVEYOR BEAM AND METHOD OF ASSEMBLY THEREFOR

[75] Inventor: John J. Douglas, Lynch Station, Va.

[73] Assignee: Simplimatic Engineering Company, Lynchburg, Va.

[21] Appl. No.: 382,534

[22] Filed: Jul. 20, 1989

[51] Int. Cl.$^5$ .................................. B65G 39/18
[52] U.S. Cl. ........................ 198/836.4; 198/841; 198/860.3; 198/861.1
[58] Field of Search ............... 198/836, 841, 860.3, 198/861.1, 836.4, 837; 52/730, 731, 732; 403/353, 405.1

[56] References Cited

U.S. PATENT DOCUMENTS

| | | | |
|---|---|---|---|
| 3,067,845 | 12/1962 | Smith | 52/730 X |
| 3,236,363 | 2/1966 | Sutliffe | 198/836 X |
| 3,292,772 | 12/1966 | Rice | 198/836 X |
| 3,460,304 | 8/1969 | Braeuninger et al. | 52/588 |
| 3,491,873 | 1/1970 | Fauth | 198/836 |
| 3,562,992 | 2/1971 | Kinsey | 52/731 X |
| 3,605,994 | 9/1971 | Parlette | 198/836 X |
| 3,647,051 | 3/1972 | Didas | 198/836 |
| 3,669,244 | 6/1972 | Pagdin et al. | 198/836 X |
| 3,799,368 | 12/1973 | Smith | 198/836 X |
| 3,800,938 | 4/1974 | Stone | 198/836 X |
| 3,825,108 | 7/1974 | Stone | 198/861.1 |
| 4,114,247 | 9/1978 | Toti | 29/453 |
| 4,145,976 | 3/1979 | Svirklys | 403/353 X |
| 4,164,283 | 8/1979 | Flajnik | 198/841 X |
| 4,325,480 | 4/1982 | Butt | 198/841 |
| 4,511,031 | 4/1985 | Lachonius | 198/836 |
| 4,535,963 | 8/1985 | Lachonius | 248/251 |
| 4,597,492 | 7/1986 | Lachonius et al. | 198/852 |
| 4,606,170 | 8/1986 | Mendenhall | 52/783 X |
| 4,632,595 | 12/1986 | Schaeff | 403/330 |
| 4,815,194 | 3/1989 | Lievesley | 29/514 |

FOREIGN PATENT DOCUMENTS

| | | | |
|---|---|---|---|
| 0017637 | 3/1989 | European Pat. Off. | |
| 3445426 | 6/1986 | Fed. Rep. of Germany | 198/836 |
| 2621022 | 10/1980 | France | |
| 1072026 | 6/1967 | United Kingdom | 198/836 |

Primary Examiner—D. Glenn Dayoan
Attorney, Agent, or Firm—St. Onge Steward Johnston & Reens

[57] ABSTRACT

A conveniently assemblable conveyor beam is provided comprising a plurality of cross members with tongue and groove combinations on opposing lateral sides thereof; a pair of opposing side guides with corresponding tongue and groove combinations formed in a sidewall thereof for hooking the side guides in a facing, parallel, and spaced apart fashion on either side of the cross members; and a pair of interference fitting edges spaced from the tongue and groove combinations for fastening the side guides to the cross members in an interference fit.

22 Claims, 5 Drawing Sheets

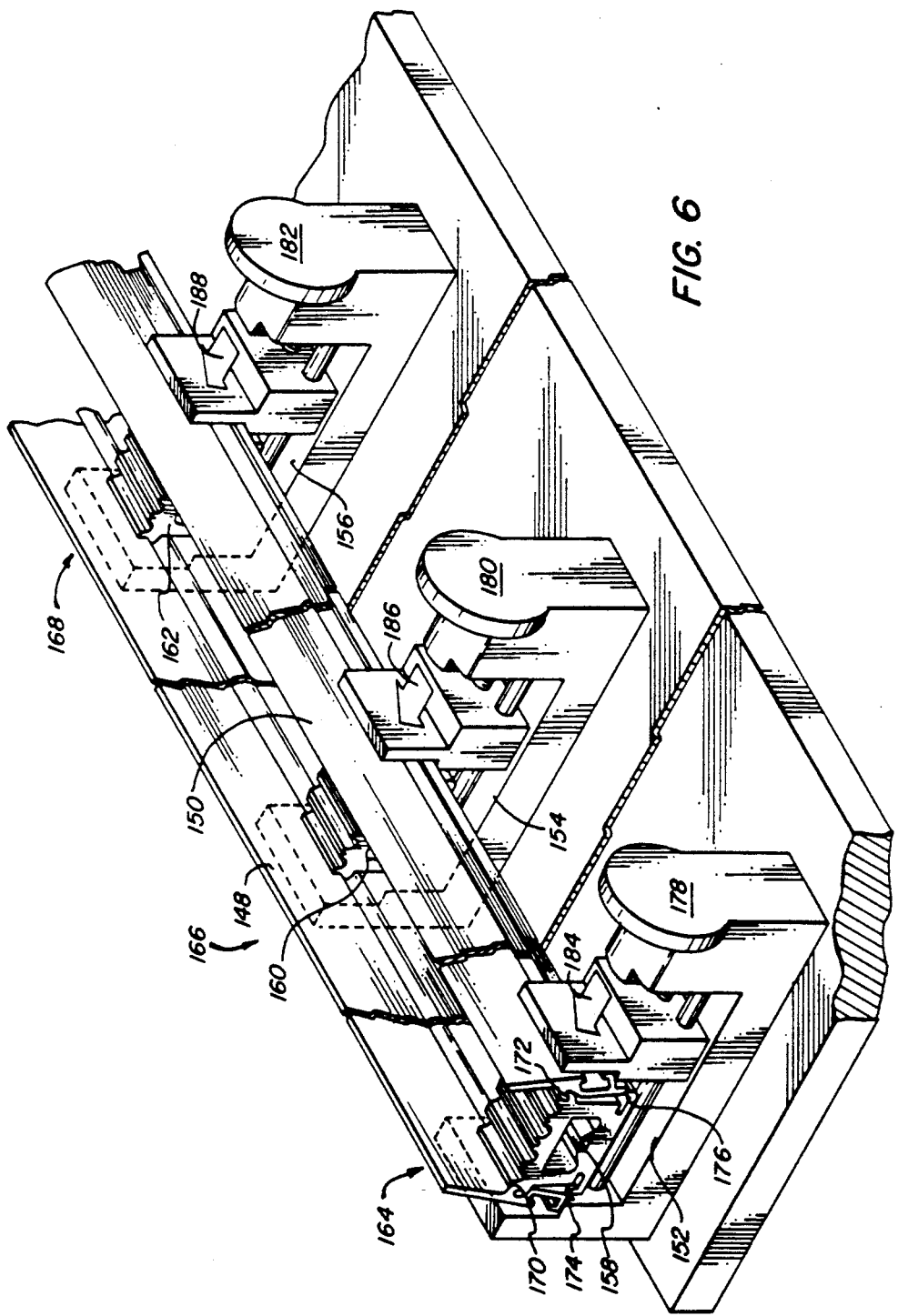

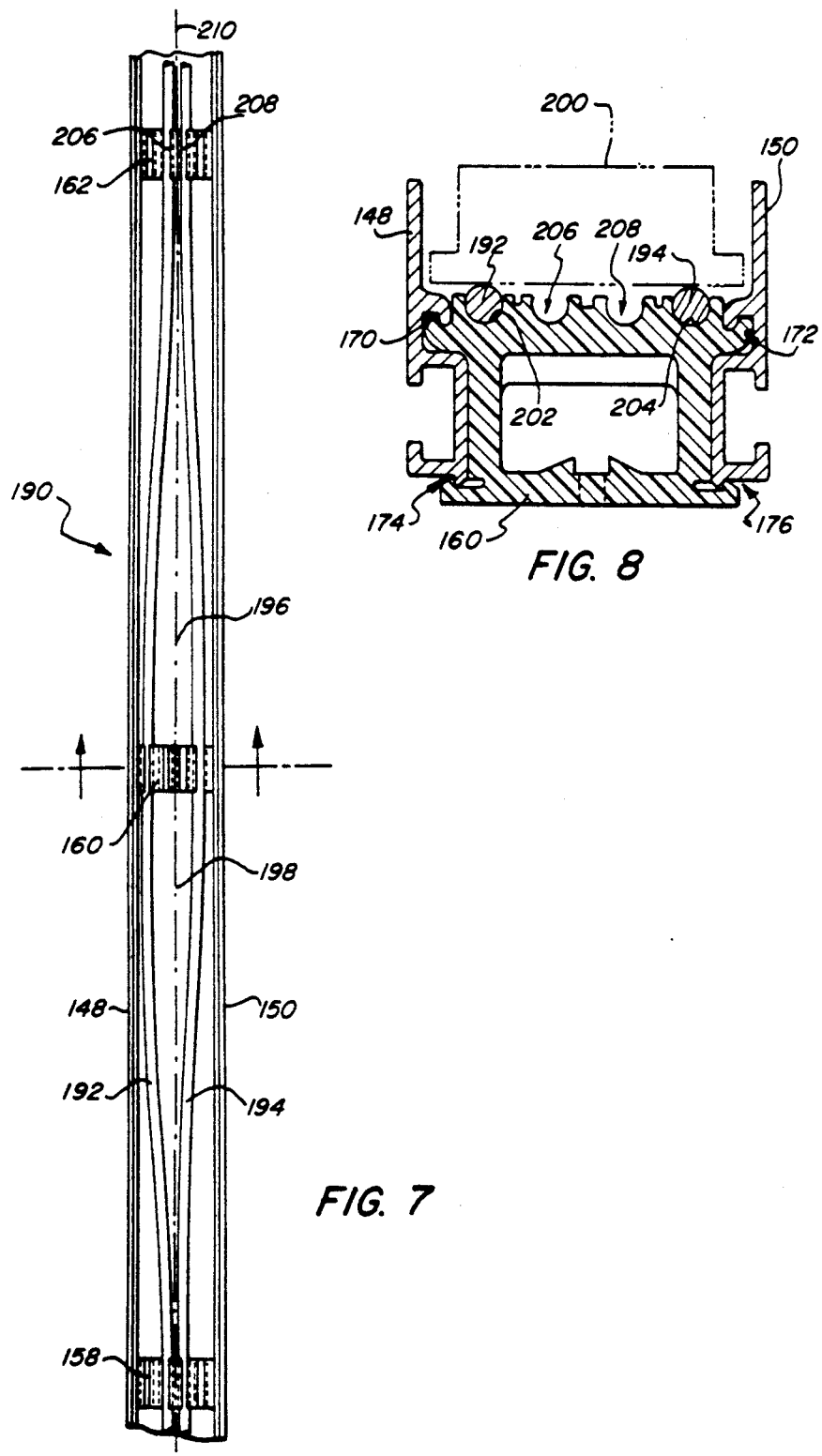

MODULAR CONVEYOR BEAM AND METHOD OF ASSEMBLY THEREFOR

FIELD OF THE INVENTION

The present invention relates to modular conveyor systems that can be conveniently assembled into a variety of configurations. More specifically, a modular conveyor beam is provided that can be interlockingly fitted together from a pair of side guides and a plurality of cross members in a particularly convenient manner.

BACKGROUND OF THE INVENTION

Modular conveyor systems using a plurality of standardized, stock components are well known in the art. Using these standardized components, a conveyor system can be custom designed for a particular layout and constructed from a collection of standard components such as a conveyor beam, side rails, chains, and chain drives using standard fasteners and bracketry.

Such a prior art modular conveyor still requires a relatively large number of labor intensive steps for assembly, such as for example bolting of the side rails to the conveyor beam along longitudinally extending T-slots in the beam. Also, if the conveyor beam is a continuously extruded piece, usually of aluminum, that is relatively expensive and results in the conveyor raceway having few downwardly directed open areas for dirt and other debris to exit the raceway to keep the raceway clean. Instead, such debris can collect on the beam and after a sufficiently long operational period can foul the conveyor and lead to rough spots, hang-ups, and even breakdowns.

See e.g. U.S. Pat. Nos. 4,511,031; 4,535,963; 4,597,492.

It is also known in the prior art to assemble conveyor systems by using one piece of stock to form the raceway floor, while two other pieces of similar stock are welded to the sides of said one piece to form a U-shaped channel along which are placed chain support rails such as metal rods for providing a surface along which the chain travels. It is known to undulate the rails back and forth across the raceway, such as for example in a sinusoidal-like fashion; otherwise, were the rods placed at only one transverse position along the entire raceway, these rods could soon wear grooves into said chain due to normal wear and tear from abrading of the chain lower surface as the chain is pulled over the rails. Such a basic conveyor system is relatively labor intensive and time consuming to build because of the number of assembly steps required, such as for example welding the three pieces of stock together. Also, the finished conveyor has a substantially continuous floor under the raceway for collecting debris. Such a floor can be a problem, particularly where the articles being transported by said conveyor along said raceway are machined articles that may have burrs or other particles clinging thereto, which particles can tend to fall off into and clog the conveyor raceway.

SUMMARY OF THE PRESENT INVENTION

In one preferred embodiment of the present invention, a conveyor beam is provided for supporting rails on which a conveyor surface can move along a conveyor pathway to transport articles. The beam comprises a plurality of high density polyethylene spacers positioned at spaced apart intervals along said assembly; elongate side guides of extruded aluminum for attachment to the spacers at lateral sides thereof to provide the conveyor side guides; and means for interlockingly engaging the side guides to the spacers.

In a particularly preferred embodiment, the spacers and the side guides have hooking means, preferably interrelatingly locking tongues and grooves at one location, and interlocking interference fitting edges at another location spaced from said first location. Interengagement of a side guide to a spacer is accomplished by hooking the tongues and grooves together at said one location and then interlocking the side guide to the spacer at said another location by pressing an edge of said side guide into an interference fit with a deformable lip on said spacer.

The spacers of the present invention have a plurality of channels formed on and open to the top side thereof for receiving and retaining chain support rails in a press fit therein. There are a larger number of channels than rails to be supported, and the rails can be press fitted into different ones of said channels from spacer to spacer along said conveyor raceway to thereby undulate the rails transversely across said raceway to avoid undue chain link wear.

It is one object of the present invention to provide a conveyor beam that can be snap fitted together using standard plastic spacers for cross members and standard aluminum side guides for forming a conveyor raceway.

It is a further object of the present invention to provide a modular conveyor system where spacers providing cross support can be spaced apart along said raceway to provide a substantially open conveyor configuration to permit debris from conveyed articles to fall through the conveyor instead of collecting therein.

It is a further object of the present invention to provide spacers for receiving chain support rails in a press-fit manner in an undulating fashion across said conveyor to avoid undue chain wear.

Further objects and advantages of the present invention will become apparent from the following description of the drawings and the preferred embodiments.

BRIEF DESCRIPTION OF THE DRAWINGS

FIG. 6 is a perspective view of one particular method of accomplishing the steps of FIGS. 5A, 5B, and 5C;

FIG. 7 is a top view of a constructed conveyor beam of the present invention; and FIG. 8 is a sectional view of the conveyor beam of FIG. 7 taken at 8—8.

DETAILED DESCRIPTION OF THE PREFERRED EMBODIMENT

Figure 1:
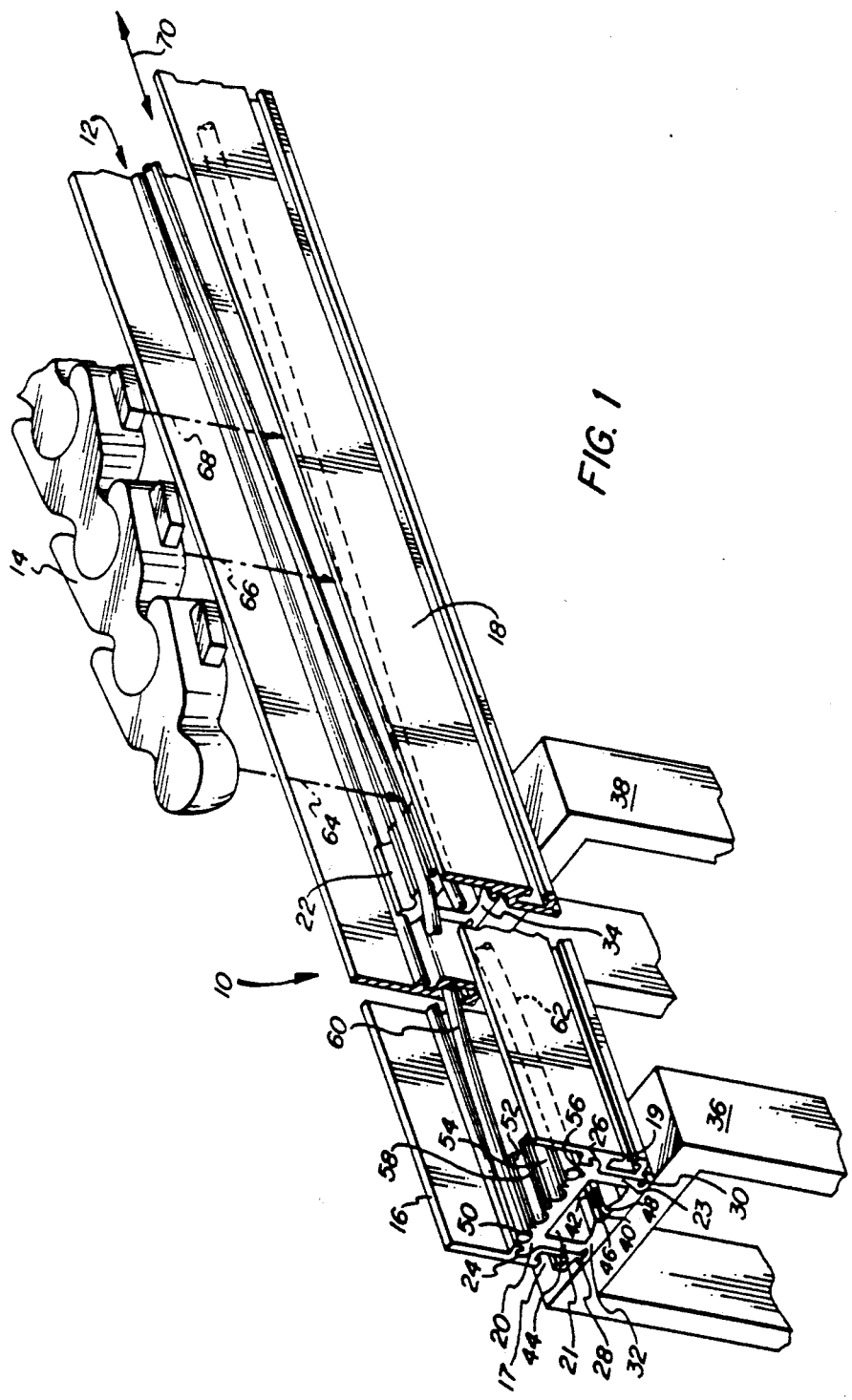
FIG. 1 is a perspective view of the modular conveyor system of the present invention.

FIG. 1 shows a perspective view of the conveyor assembly 10 of the present invention, where a raceway 12 for receiving a conveyor surface such as for example chain 14 is formed by a pair of side guides 16 and 18 interrelatingly locked to spacers such as at 20 and 22. Side guides 16 and 18 as well as spacers such as 20 have hooking means, preferably interlocking tongue and groove combinations indicated generally at 24 and 26, and also interference fitting means indicated generally at 28 and 30 for interlockingly engaging said side guides 16 and 18 to lateral walls 21 and 23 of spacer 20 as shown, preferably in a snap fit.

Side guides 16 and 18 are formed from a conventionally suitable material, preferably a metal such as extruded aluminum, and have conventionally shaped slots such as T-slots 17 and 19 in outwardly facing sides thereof for routine mounting of additional conveyor hardware such as standard accessories (not shown).

Spacers such as 20 and 22 are preferably formed from a polymeric material such as for example extruded high density polyethylene. Spacers 20 and 22 have bottom wall portions 32 and 34 for mounting to routine support frames 36 and 38 respectively by means of conventional fasteners such as nut 40 threaded onto bolt 42, which bolt extends through bottom wall 32 into cavity 44 in the center of spacer 20. Channel shaped bottom cavity sidewalls 46 and 48 grip nut 40 to restrain nut 40 from turning as bolt 42 is tightened.

Spacers such as at 20 have a plurality of channels, such as for example four channels 50, 52, 54, and 56, extending across top wall 58 of spacer 20 for receiving therein in a press fit manner two rails 60 and 62 for supporting chain 14 as indicated by arrows 64, 66, and 68 vertically in said raceway 12, which extends longitudinally along a path indicated by double-headed arrow 70. Channels 50, 52, 54, and 56 in each spacer permit rails 60 and 62 to be selectively undulated back and forth in a serpentine fashion between successive spacers to avoid excessive chain wear as further described below.

Figure 2:
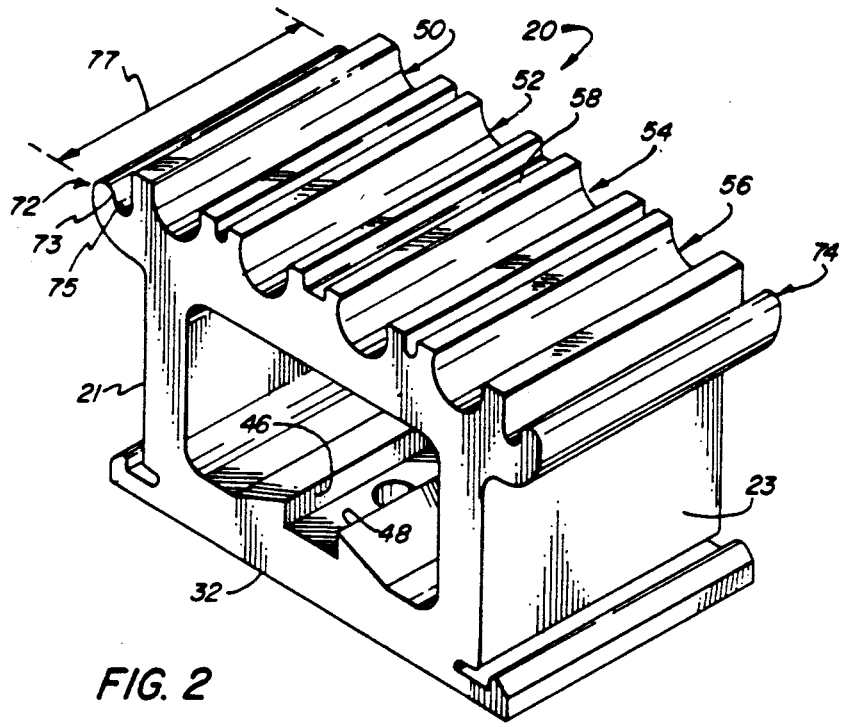
FIG. 2 is a perspective view of the spacer of the present invention.
Figure 3:
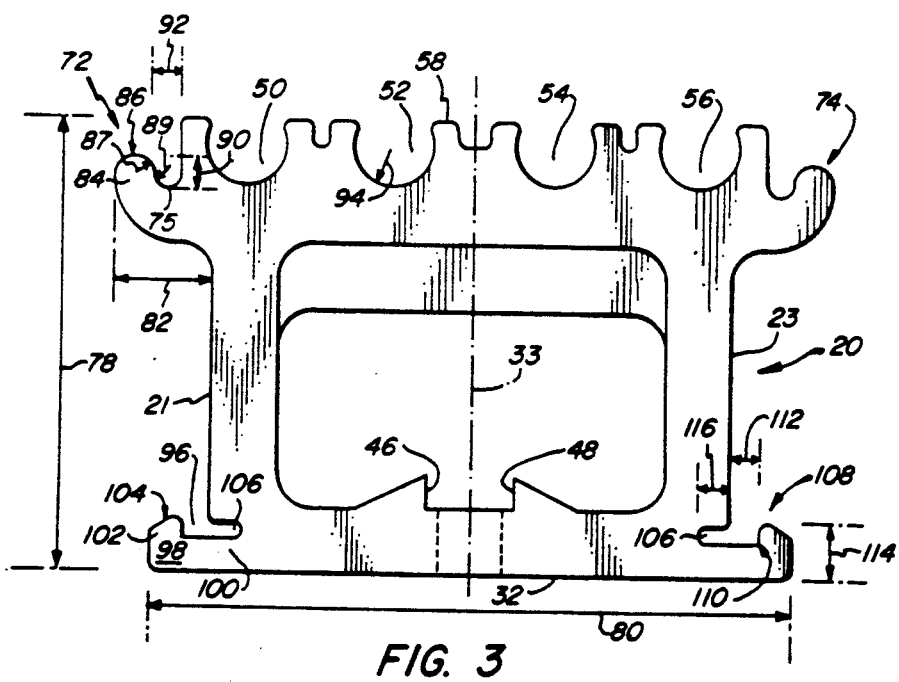
FIG. 3 is an end view of the spacer of FIG. 2.

FIGS. 2 and 3 show perspective and end views respectively of the spacer of the present invention such as for example spacer 20. Spacer 20 has a pair of hooking means, preferably tongue and groove combinations 72 and 74 in the region of top wall 58, for cooperating with corresponding hooking means, preferably tongue and groove combinations such as 76 for side guide 16 shown in end view in FIG. 4. Tongue and groove combination 72 has an upper longitudinally extending rib 73 which is spaced from said spacer to form groove 75 of said combination 72. Combination 72 provides a means for hooking corresponding combination 76 of side guide 16 onto spacer 20. It is understood that combination 72 could also be any suitable lip-like structure with hook-like elements.

In the preferred embodiment, spacer 20 has a length 77 of substantially about 1.5 inches, a height 78 of substantially about 1.7 inches, and a width 80 at the bottom wall of substantially about 2.5 inches. Approximately seven spacers are used for ten feet of conveyor beam, although the number can of course be varied to suit the loading requirements for the beam.

Tongue and groove combination 72 protrudes upwardly and outwardly from wall 21 a distance 82 of substantially about 0.375 inches. Upper rib 73 has a rounded crest 86 with a radius of curvature 87 of substantially about 0.070 inches, while groove 75 has a curved floor with a radius of curvature 89 of substantially about 0.055 inches. Groove 75 has a depth as indicated at 90 of approximately about 0.125 inches.

Inasmuch as spacer 20 is symmetrical about centerline 33 passing equidistant between lateral walls 21 and 23, tongue and groove combination 74 is substantially identical except for being on the opposing wall 23 of spacer 20.

Each of the channels 50, 52, 54, and 56 has a channel floor with a radius of curvature such as for example indicated at 94 of 0.3 inches for mounting rails 60 and 62, which in the preferred embodiment are of substantially circular cross section, to spacer 20. Rails 60 and 62 are of suitable material such as for example cold rolled steel and have a slightly larger diameter than the width of channels, which thereby are enabled to receive and retain said rails in a press fit. It is understood that rails 60 and 62 need not be limited to two in number and further need not be round. Other suitable configurations could be used with matching means for mounting the supports to the spacer.

Spacer 20 also has a groove 96 adjacent said bottom wall 32 formed by a deformable element or lip such as L-shaped lower rib 98 having a first leg 100 attached to spacer 20 and a second leg 102 upwardly extending from first leg 100. Second leg 102 has a shaped tapered surface 104 for receiving a bottom edge surface of the side guide as further to be described below. A longitudinally extending notch 106 is cut into spacer 20 at the juncture of leg 100 with spacer 20, which notch 106 makes leg 100 more resilient in bending downwardly to receive the edge of the side guide as further described below. The dimensions of the lower groove are shown with respect to opposing member 108, which is identical to member 98 in all material respects. Sidewall 110 is spaced a distance 112 of substantially about 0.110 inches from wall 23, whereas the distance 114 is about 1/16". Notch 106 is about ⅛" deep as indicated at 116.

Rib 98 in the preferred embodiment provides a preferred means for fastening the lower edge 120 of side guide 16 to spacer 20 by interengaging edge 120 in an interference fit. It is understood that other means of fastening side guide 16 at this location could be used as well. By way of example only, side guide 16 could have a bore therethrough that mates with a deformable connecting structure extending outwardly from spacer 20 such as a flanged rod. Other conventional fasteners could be used as well.

Figure 4:
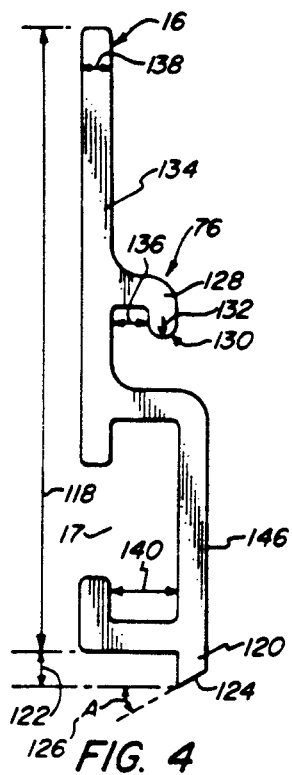
FIG. 4 is an end view of the side guide of the present invention.

FIG. 4 shows an end view of a side guide such as 16. Both side guides are identical in the preferred embodiment and are simply reversed in position to mirror each other to form opposite side guides. Downwardly depending and inwardly protruding hooking means such as tongue and groove combination 76 is for mating with tongue and groove combination 72 as already described above with respect to FIGS. 2 and 3 and as further shown in FIGS. 5A, 5B, and 5C. As shown in FIG. 4, guide 16 has a length indicated at 118 of preferably substantially about 2.4 inches, with lower edge 120 having a length of approximately about 0.125 inches as indicated at 122. Lower edge 120 has a tapered surface 124 at an angle A at 126 of preferably about 30°. It is further understood that side guide 16 could also extend further below lower edge 120 to form side guides below spacer 20 as well.

Downwardly depending shoulder 128 has a rounded surface 130 of radius 132 of about 0.055 inches and is spaced apart from side wall 134 of side guide 16 a distance 136 of about 0.140 inches. Guide 16 itself is approximately 0.110 inches thick, as indicated at 138. T-shaped slot 17 has a depth 140 of substantially about 0.265 inches.

Figure 5A:
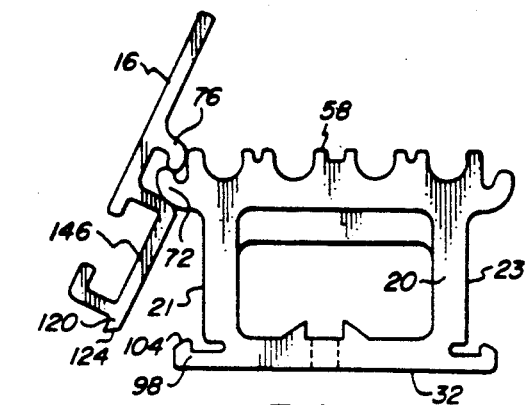
FIGS. 5A, 5B, and 5C are end views illustrating the assembly of the side guides onto the spacers to form the beam of the present invention.
Figure 5B:
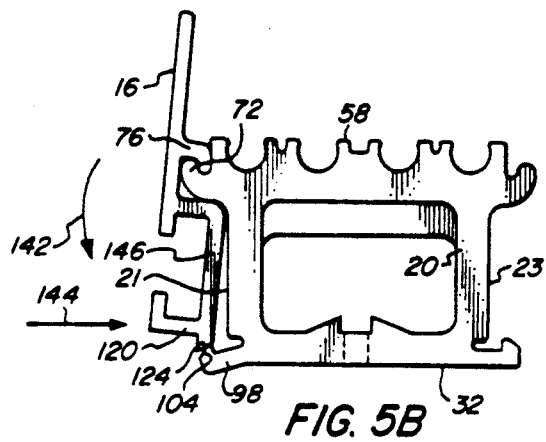
Figure 5C:
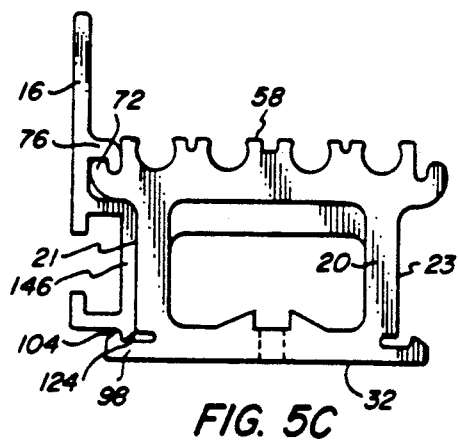

FIGS. 5A, 5B, and 5C illustrate how side guide 16 is mounted on spacer 20. First, as shown in FIG. 5A, tongue and groove combination 76 is hooked over the matching tongue and groove combination at 72 of spacer 20. Then, as depicted by arrow 142 at FIG. 5B, guide 16 is rotated about tongue and groove combination 72 to engage tapered surfaces 124 and 104 and bend rib 98 downwardly as the lower edge 120 is urged inwardly, as shown by arrow 144, to snappingly press lower edge 120 into an interference locking fit as shown in FIG. 5C. Wall portion 146 of guide 16 preferably fits snugly up against wall 21.

FIG. 6 illustrates a particularly preferred method for assembling the conveyor of the present invention. A pair of opposing side guides 148 and 150 are assembled in longitudinally spaced generally U-shaped jigs 152, 154, and 156 With identical spacers 158, 160, and 162 positioned therebetween at intervals 164, 166, and 168 spaced longitudinally along said side guides. Guides 148 and 150 can be partially assembled With the spacers 158, 160, and 162 beforeplacing in jigs 152, 154, and 158 by clamping the spacers on a support strip and hooking the tongue and groove combinations together along the top of the spacers. In this partially assembled state, the clamps are loosened to release the spacers and the partially assembled beam is then placed in the jigs. With tongue and groove combinations such as at 170 and 172 of the side guides and spacers hooked as indicated, lower edges 174 and 176 can be pressed into interlocking engagement by vises 178, 180, and 182 applying inwardly directed forces as indicated by arrows 184, 186, and 188.

FIG. 7 shows a top view of a length of the conveyor beam 190 of the present invention assembled with rails 92 and 194 placed therein in an undulating or serpentine fashion. It can be readily appreciated that conveyor beam 190 provides open spaces such as 196 and 198 between spacers 158, 160 and 162 for permitting dirt, debris, and other extraneous loose material from articles being transferred to fall through the conveyor. A suitable elongated tray or other structure could be placed below the conveyor raceway if such openness were not desired.

FIG. 8 shows a cross section of assembled conveyor section 190 taken at 8—8. The position to be occupied by a continuous conveyor surface such as chain 200 is shown in phantom, with rails 192 and 194 shown in place in channels 202 and 204. Rails 192 and 194 in FIG. 8 are positioned in the two outermost channels 202 and 204, while in the adjacent spacer 162 as shown in FIG. 7 the rails 192 and 194 are in the two innermost channels such as 206 and 208 to form an undulating pattern which here is symmetrical about the conveyor centerline 210 and is preferably repeated along the conveyor raceway.

It is understood that the interlocking tongue and groove combination of the preferred embodiment can be any conventional means for interlockingly interengaging or meshing the side guides with the spacer to interlock said guides together. The guides and spacers form a subassembly that can be conveniently interfitted to form a full length conveyor system. While tongue and groove construction is preferred, the present invention contemplates any suitable means for interlockingly interengaging said guides and can of course include other suitably convenient conventional fastener type devices.

It is further understood that terms such as "upper", "lower", "above", "below", "top", "bottom", "left", and "right" are used to indicate relative position only and are not intended to be limiting of the invention.

It should be further understood that the actual dimensions given for the preferred embodiment are illustrative only and can be changed over a wide range in a routine fashion to accommodate a variety of size and load requirements.

It should be further understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A modular conveyor assembly for supporting a conveyor for transporting articles, said assembly comprising:
   (a) a plurality of spacers positioned at spaced apart intervals along said assembly, said spacers having on a first side thereof a plurality of conveyor surface support receiving elements;
   (b) elongate side guides for attachment to said spacers at second and third sides thereof; and
   (c) means for snappingly fitting said side guides to said spacers;
   said snappingly fitting means comprising interlocking tongues and grooves on said side guides and spacers at opposing sides thereof;
   said spacers and said side guides each having elongate interengaging tongues and grooves at one location and interengaging interference fitting edges at another location spaced from said first location so as to permit engagement of a side guide to a spacer at said one location before locking said side guide to said spacer at said another location;
   said side guide having opposing edges with an elongate tongue and groove formed along said side guide towards one said edge and said spacer has a corresponding tongue and groove formed along a side thereof, said tongues for fitting into said grooves before locking said side guide to said spacer at the other of said edges; and
   one of said tongues protruding from said side guide in a downwardly depending and inwardly extending direction and said other tongue protrudes from said spacer in an upwardly depending and outwardly extending direction, and
   said side guide is supportable on said spacer by interfitting said tongues;
   whereby said assembly can be conveniently constructed.

2. The modular conveyor assembly of claim 1, wherein said spacer has an elongate means for hooking one of said opposing edges into engagement with said spacer after said tongues are interfitted.

3. A modular conveyor assembly comprising:
   (a) a pair of elongated members having opposing upper and lower edges, said pair for being positioned in a spaced apart and parallel relationship, said members having sidewalls facing each other to form opposing sidewalls of a conveyor pathway therebetween, each said member having in the region of said upper edge thereof a longitudinally extending shoulder protruding towards said pathway from said sidewall inwardly and downwardly; and (b) a plurality of spacers for being positioned in longitudinally spaced apart locations between said sidewalls at selected intervals along said pathway, said spacers for lockingly receiving both said shoulders and lower edges to securely join said elongated members in a facing but spaced apart and parallel relationship along the length of said pathway to form said pathway therebetween, each said spacer being symmetrical about a vertical plane passing therethrough, said spacer having opposing lateral walls joined by top and bottom walls, said spacer having longitudinally extending upper ribs on each lateral wall adjacent said top wall, said upper ribs protruding outwardly and upwardly in a vertical direction in a hook-like manner for receiving thereon said shoulders of said opposing members to support said member pair thereon, said shoulders and said upper ribs being shaped and dimensioned for mating with each other, said spacer further having on both opposing lateral walls and adjacent said bottom wall a lower rib also protruding outwardly and upwardly in a vertical direction towards said top wall, said two lower ribs having a shape and being dimensioned for lockingly receiving the two lower edges of said members between said lower ribs and said lateral walls when said shoulders are hooked on said upper ribs and said lower edges are urged inwardly towards said spacer to a locking engagement between said lower ribs and said lateral walls, whereby said member pair can be securely assembled onto opposing sides of said spacers to form said pathway therebetween.

4. The modular conveyor assembly of claim 3, wherein said top wall has formed therein a plurality of parallel, upwardly facing, and spaced apart channels open to a vertical direction for receiving and lockingly retaining therein in an aligned position at least one horizontally extending chain support member for vertically supporting said conveyor chain in said pathway.

5. The modular conveyor assembly of claim 4, wherein an outermost pair and an innermost pair of said channels are for receiving left and right flexible support rails, each said rail to be alternated between an outermost channel at one spacer and then an adjacent one of said innermost channels for a successive spacer along said raceway in an alternating fashion between spacers positioned along said raceway.

6. The modular conveyor of claim 5, wherein said rails have a circular cross-section and each said channel has a corresponding cylindrically shaped floor for lockingly receiving said rails therein.

7. The modular conveyor assembly of claim 3, wherein said lower rib includes an L-shaped rib protruding outwardly and upwardly from said lateral wall, a first leg of said L being joined to said spacer and a second leg of said L for pointing in a vertical direction, said first leg having a length sufficient to space said second leg apart from said lateral wall to form a longitudinally extending slot between said second leg and said lateral wall for receiving said lower edge therein.

8. The modular conveyor assembly of claim 7, wherein said second leg has a leg end surface tapered in an outward direction over which surface said lower edge slides as said lower edge is urged into said slot, said first leg being sufficiently deformable to bend away from said lower edge to permit said lower edge to be snappingly received into said slot.

9. The modular conveyor assembly of claim 8, wherein a longitudinally extending notch is formed into said lateral wall adjacent a juncture of said L-shaped rib with said lateral wall, said notch for enhancing the deformability of said L-shaped rib in accepting said lower edge.

10. The modular conveyor assembly of claim 9, wherein said second leg has a straight walled portion facing said lateral wall for lockingly receiving said lower edge therebetween to securely affix said member to said spacer.

11. The modular conveyor assembly of claim 10, wherein said spacer forms a cavity therethrough in a longitudinal direction, and said bottom wall has at least one bore formed therethrough into said cavity for receiving means for affixing said spacer to a support surface.

12. The modular conveyor assembly of claim 11, wherein said cavity is formed by a radially inwardly facing cavity wall of said spacer, and said bore passes from said bottom wall through to said cavity wall, and said cavity wall has formed adjacent said bore means for gripping said affixing means to facilitate affixing of said mounting means.

13. The modular conveyor assembly of claim 12, wherein said affixing means includes a bolt and nut combination, and said gripping means includes a pair of spaced apart walls dimensioned for receiving said nut therebetween to restrain said nut against rotation.

14. The modular conveyor assembly of claim 3, wherein said member has formed therein a longitudinally extending slot for use in mounting conveyor system elements to said modular conveyor system.

15. The modular conveyor assembly of claim 8, wherein said lower edge has a correspondingly shaped portion for sliding over said tapered surface.

16. The modular conveyor assembly of claim 3, wherein said members are formed from extruded aluminum.

17. The modular conveyor assembly of claim 16, wherein said spacer is molded from a high density polyethylene.

18. A modular conveyor assembly comprising:
(a) a pair of elongated members having opposing upper and lower edges, said pair for being positioned in a spaced apart and parallel relationship, said members having sidewalls facing each other to form opposing sidewalls of a conveyor pathway therebetween, each said member having in the region of said upper edge thereof a longitudinally extending shoulder protruding towards said raceway from said sidewall inwardly and downwardly; and
(b) a plurality of spacers for being positioned in longitudinally spaced apart locations between said sidewalls at selected intervals along said pathway, said spacers for lockingly receiving both said shoulders and lower edges to securely join said elongated members in a facing but spaced apart and parallel relationship along the length of said pathway to form said pathway therebetween, each said spacer being symmetrical about a vertical plane passing therethrough, said spacer having opposing lateral walls joined by top and bottom walls, said spacer having longitudinally extending upper ribs on each lateral wall adjacent said top wall, said upper ribs protruding outwardly and upwardly in a vertical direction in a hook-like manner for receiving thereon said shoulders of said opposing members to support said member pair thereon, said shoulders and said upper ribs being shaped and dimensioned for mating with each other, said spacer further having on both opposing lateral walls and adjacent said bottom wall a lower rib also protruding outwardly and upwardly in a vertical direction towards said top wall, said two lower ribs having a shape and being dimensioned for lockingly receiving the two lower edges of said members between said lower ribs and said lateral walls when said shoulders are hooked on said upper ribs and said lower edges are placed into locking engagement between said lower ribs and said lateral walls, whereby said member pair can be securely assembled into opposing sides of said spacers to form said pathway therebetween 19. The modular conveyor assembly of claim 18, wherein said lower rib includes an L-shaped rib protruding outwardly and upwardly from said lateral wall, a first leg of said L being joined to said spacer and a second let of said L for pointing in a vertical direction, said first leg having a length sufficient to space said second leg apart from said lateral wall to form a longitudinally extending slot between said second leg and said lateral wall for receiving said lower edge therein.

20. The modular conveyor assembly of claim 19, wherein said second leg has a leg end surface tapered in an outward direction over which surface said lower edge slides as said lower edge is urged into said slot, said first leg being sufficiently deformable to bend away from said lower edge to permit said lower edge to be snappingly received into said slot.

21. The modular conveyor assembly of claim 20, wherein a longitudinally extending notch is formed into said lateral wall adjacent a juncture of said L-shaped rib with said lateral wall, said notch for enhancing the deformability of said L-shaped rib in accepting said lower edge.

22. The modular conveyor assembly of claim 21, wherein said second leg has a straight walled portion facing said lateral wall for lockingly receiving said lower edge therebetween to securely affix said member to said spacer.

* * * * *